United States Patent
Kim et al.

(10) Patent No.: US 8,894,116 B2
(45) Date of Patent: Nov. 25, 2014

(54) GRIPPER OF ROBOT FOR ASSEMBLING VEHICLE

(71) Applicants: Hyundai Motor Company, Seoul (KR); Industry-Academic Cooperation Foundation, Yonsei University, Seoul (KR)

(72) Inventors: Jung Hoon Kim, Seoul (KR); Myoung Hoon Shim, Seoul (KR); Jae Young Choi, Gyeonggi-do (KR)

(73) Assignees: Hyundai Motor Company, Seoul (KR); Industry-Academic Cooperation Foundation, Yonsei University, Seoul (KR)

( * ) Notice: Subject to any disclaimer, the term of this patent is extended or adjusted under 35 U.S.C. 154(b) by 0 days.

(21) Appl. No.: 13/889,686

(22) Filed: May 8, 2013

(65) Prior Publication Data

US 2014/0132019 A1    May 15, 2014

(30) Foreign Application Priority Data

Nov. 14, 2012   (KR) ........................ 10-2012-0128571

(51) Int. Cl.
    *B66C 1/00*        (2006.01)
    *B25J 15/00*      (2006.01)

(52) U.S. Cl.
    CPC .................................. *B25J 15/0028* (2013.01)
    USPC .......................... 294/104; 294/67.22; 294/197

(58) Field of Classification Search
    USPC ........... 294/104, 67.22, 197, 213; 901/34, 38, 901/39, 46; 414/729
    See application file for complete search history.

(56) References Cited

U.S. PATENT DOCUMENTS

| | | | | | |
|---|---|---|---|---|---|
| 1,745,292 | A | * | 1/1930 | Buser | 294/50.9 |
| 3,034,820 | A | * | 5/1962 | Schwartz | 294/197 |
| 3,119,637 | A | * | 1/1964 | Eaves | 294/67.22 |
| 3,669,293 | A | * | 6/1972 | Bryan et al. | 414/704 |
| 4,078,839 | A | * | 3/1978 | Chambers et al. | 294/31.1 |
| 4,266,819 | A | * | 5/1981 | Pemberton | 294/197 |
| 4,405,168 | A | * | 9/1983 | Fritzsche et al. | 294/104 |
| 6,227,588 | B1 | * | 5/2001 | Cassoni | 294/104 |
| 6,601,891 | B1 | * | 8/2003 | Gregory, Jr. | 294/197 |
| 2009/0060699 | A1 | * | 3/2009 | Arnold | 414/729 |
| 2010/0217436 | A1 | * | 8/2010 | Jones et al. | 700/245 |
| 2011/0320038 | A1 | * | 12/2011 | Motoki et al. | 700/245 |
| 2013/0119687 | A1 | * | 5/2013 | Dai | 294/200 |

FOREIGN PATENT DOCUMENTS

KR    10-2004-0017667      2/2004

* cited by examiner

*Primary Examiner* — Saul Rodriguez
*Assistant Examiner* — Gabriela Puig
(74) *Attorney, Agent, or Firm* — Edwards Wildman Palmer LLP; Peter F. Corless

(57) ABSTRACT

A gripper of a robot for assembling a vehicle is provided, including: a gripper body that extends vertically; a lower grip that bends forward from a lower end of the gripper body and supports a lower end of an assembly object; an upper grip that is hinged at a rear end to an upper end of the gripper body and grips an upper end of the assembly object when rotating forward by extending forward at a front end of the upper grip; a seat that extends and bends rearward from the upper end of the gripper body; a link assembly that is composed of a first link and a second link that connect an upper end of the seat and the upper grip via the link assembly; and a driving unit that rotates the upper grip forward or rearward by transmitting a driving force to the link assembly.

13 Claims, 5 Drawing Sheets

GRIPPER OF ROBOT FOR ASSEMBLING VEHICLE

CROSS-REFERENCE TO RELATED APPLICATION

This application claims under 35 U.S.C. §119(a) the benefit of Korean Patent Application No. 10-2012-0128571 filed Nov. 14, 2012, the entire contents of which are incorporated herein by reference.

BACKGROUND (a) Technical Field

The present invention relates to a gripper of a robot for assembling a vehicle which is used in the industrial field of vehicle manufacturing.

(b) Description of the Related Art

A gripper for assembling a vehicle of the related art is disclosed in Korean Publication No. 10-2004-0017667A, which includes: a vertically movable rail that is disposed at a side of an assembly process; a slide block that vertically slides by a driving unit along the rail; a vertical frame that is fixed to the slide block; an upper horizontal frame that is mounted on the vertical frame; a lower horizontal frame that is mounted on the lower end of the vertical frame; a clamping unit that is mounted at both ends of the upper horizontal frame and clamps a radiator support upper center panel; a mount reference pin that is mounted at both ends of the lower horizontal frame and is inserted and mounted in a restriction hole formed at a lower portion of a front bumper rail on a front end assembly; and a mount status detection unit that is mounted inward from the mount reference pin and detects the mount status of the mount reference pin by acting on the front bumper rail on the front end assembly. The above-described gripper device is provided to accurately mount and install a front end assembly of a vehicle that is applied through modulation to minimize an in-line assembly process of factory manufacturing vehicles, to keep the exterior quality of the front end assembly, to minimize assembly error by fixing the front end assembly to the vehicle body, and to efficiently process the complete vehicle.

A loader proposed according to the related art is applied to an automated robot to be applied to an FEM (Front End Module) assembly process, and the FEM is large in volume relative to its weight (e.g., 40 kg), and has a complicated shape.

Therefore, in an automated robot for carrying the FEM, the gripper (which imitates the human hand) is applied to common robots, but has difficulty performing the FEM assembly process. In particular, since the loader of the related art does not have a high output relative to its weight, when it is applied to an environment with high loads, the gripper system becomes large or is too large to be feasible, and works with an exclusive loader in the existing FEM assembly process. However, the FEM loader, which is designed to be mounted and operated on a hoist, as labor saving equipment, cannot be applied to industrial robots due to its large volume and weight, and is optimized only for the FEM assembly process, so that a gripper that can be applied to common industrial robots is necessary. That is, a wearing robot is necessary to freely lift and carry a large and heavy FEM, so it needs an appropriate gripper.

The description provided above as a related art of the present invention is just for helping understanding the background of the present invention and should not be construed as being included in the related art known by those skilled in the art.

SUMMARY OF THE DISCLOSURE

The present invention has been made in an effort to solve the above-described problems associated with the related art, and an object of the present invention is to provide a gripper of a robot for assembling a vehicle that can be applied to common industrial robots or wearing robots.

In order to achieve the object of the present invention, a gripper of a robot for assembling a vehicle includes: a gripper body that extends vertically; a lower grip that bends forward from a lower end of the gripper body and supports the lower end of an assembly object; an upper grip that is hinged at a rear end to an upper end of the gripper body and grips an upper end of the assembly object when rotating forward by extending forward at a front end of the gripper body; a seat that extends and bends rearward from the upper end of the gripper body; a link assembly that is composed of a first link and a second link that connect the upper end of the seat and the upper grip via the link assembly; and a driving unit that rotates the upper grip forward or rearward by transmitting a driving force to the link assembly.

The gripper body may be longitudinally contractible/extendable.

The gripper body may have a vertical body portion, a bending portion that bends rearward from a lower end of the vertical body portion, and a vertical portion that extends vertically downward from a lower end of the bending portion.

The lower grip may bend forward from a lower end of the vertical portion of the gripper body.

Pressure sensors may be disposed at the vertical portion and the lower grip of the gripper body for detecting whether the lower end of the assembly object has been completely gripped by the lower grip.

A shock-absorbing portion that protrudes forward and comes in contact with the assembly object may be formed at the vertical body portion of the gripper body, so that the assembly object may be prevented from inclining rearward when moving.

A locking protrusion protruding upward may be formed on a front end of the lower grip and may prevent the assembly object from separating forward by locking the lower end of the assembly object.

The upper grip may be hinged to the upper end of the gripper body at the rear end and may extend with the front end of the gripper body in a parabolic shape.

A rear end of the first link of the link assembly may be connected to the upper end of the seat by a first hinge, a rear end of the second link may be connected to a front end of the first link by a second hinge, and a front end of the second link may be connected to the upper grip by a third hinge.

The driving unit may be an electric motor that is disposed at the seat and transmits rotational force to the rear end of the first link.

The first link and the second link of the link assembly may be fully opened and positioned in a straight line, when the assembly object is completely gripped by the lower grip and the upper grip.

The seat may bend and extend orthogonally between a rear direction and an upward direction from the upper end of the gripper body.

The seat may be longitudinally contractible/extendable.

The assembly object may be an FEM of a vehicle, the lower grip may grip a bumper module of the FEM, and the upper grip may grip an upper end of the FEM.

The assembly object may be a fuel tank module or a shock absorber module of a vehicle, the lower grip may grip a lower end of the fuel tank module or the shock absorber module, and the upper grip may grip an upper end of the fuel tank module or the shock absorber module.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

BRIEF DESCRIPTION OF THE DRAWINGS

The above and other features of the present invention will now be described in detail with reference to certain exemplary embodiments thereof illustrated the accompanying drawings which are given hereinbelow by way of illustration only, and thus are not limitative of the present invention, and wherein.

Figure 1:
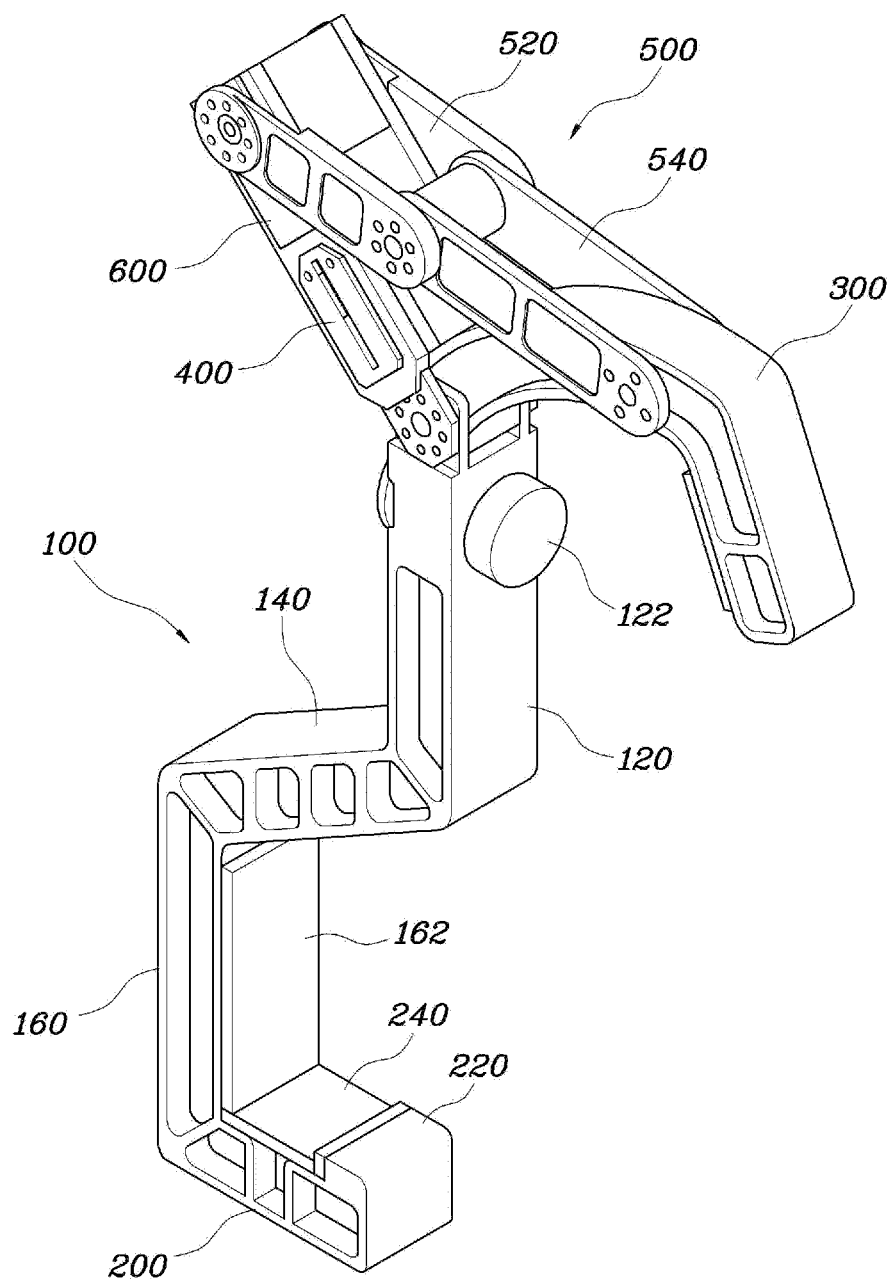
FIG. 1 is a perspective view of a gripper of a robot for assembling a vehicle according to an exemplary embodiment of the present invention.

It should be understood that the appended drawings are not necessarily to scale, presenting a somewhat simplified representation of various preferred features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

A gripper of a robot for assembling a vehicle according to an embodiment of the present invention is described hereafter with reference to the accompanying drawings.

FIG. 1 is a perspective view showing a gripper of a robot for assembling a vehicle according to an embodiment of the present invention, where the gripper preferably includes: a gripper body 100 that extends vertically; a lower grip 200 that bends forward from a lower end of the gripper body 100 and supports the lower end of an assembly object F; an upper grip 300 that is hinged at a rear end to an upper end of the gripper body 100 and grips the upper end of the assembly object F when rotating forward by extending forward at a front end of the gripper body; a seat 400 that extends and bends rearward from the upper end of the gripper body 100; a link assembly 500 that is composed of a first link 520 and a second link 540 that connect the upper end of the seat 400 and the upper grip 300 via the link assembly; and a driving unit 600 that rotates the upper grip 300 forward or rearward by transmitting a driving force to the link assembly 500.

Figure 2:
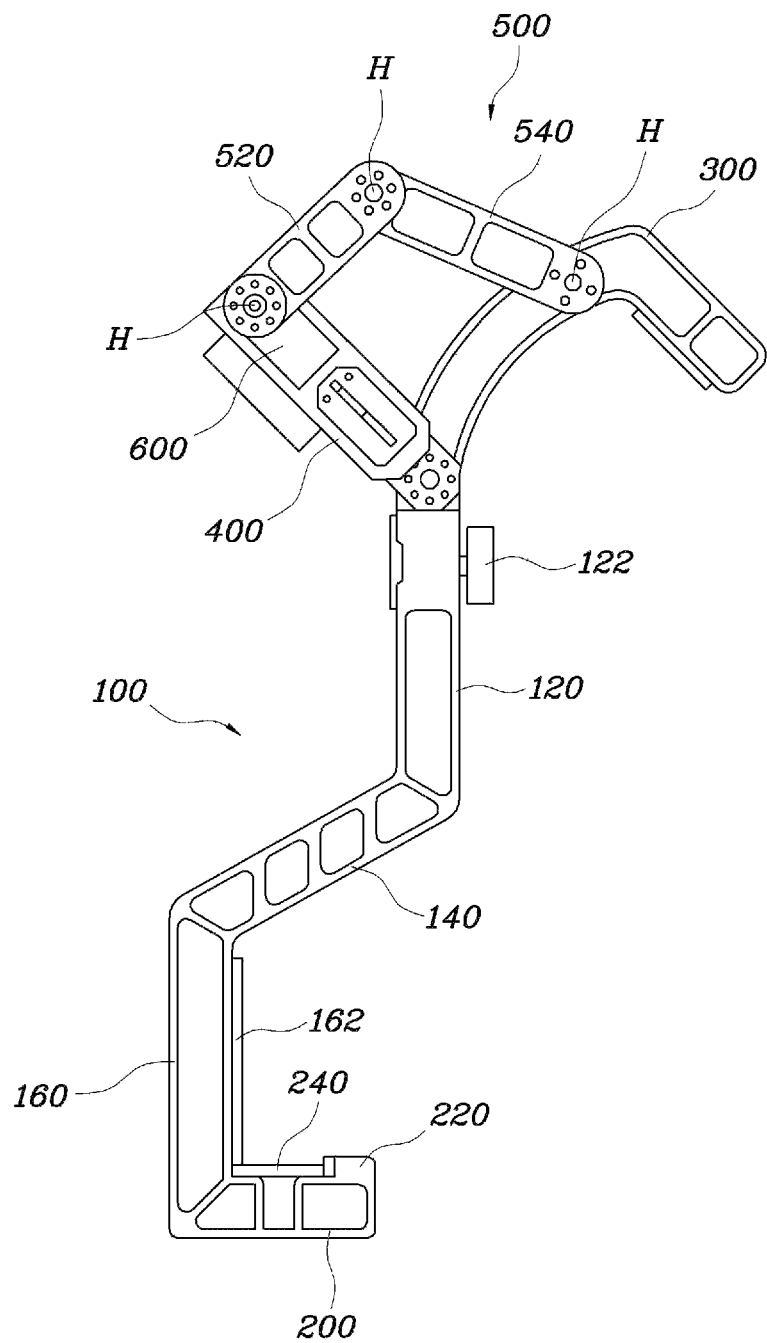
FIGS. 2 to 3 are views showing the operation of the gripper as shown in FIG. 1.
Figure 3:
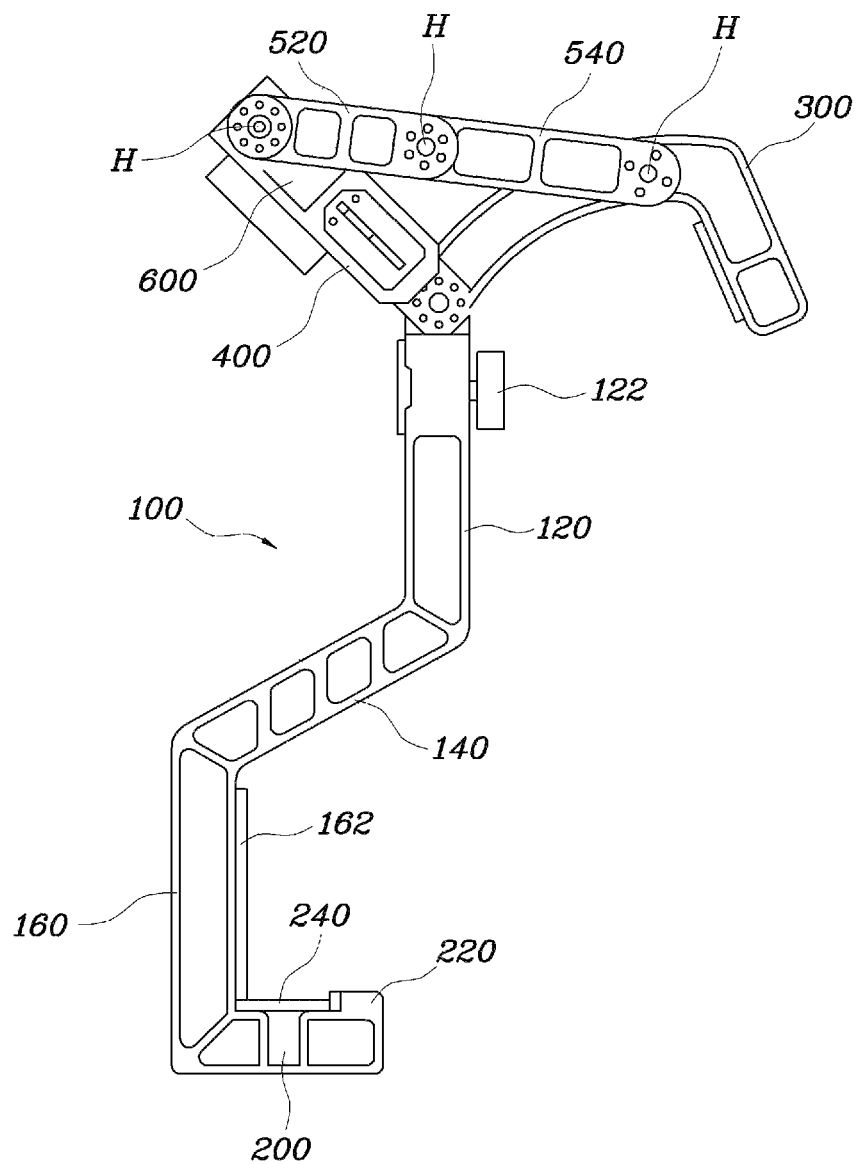

Further, FIGS. 2 and 3 illustrate the operation of the gripper of a robot for assembling a vehicle, in which FIG. 2 shows a normal status of the gripper, and FIG. 3 shows a status of the gripper when it grips an assembly object.

The gripper body 100 of the present invention vertically extends and constitutes the basic frame of the gripper. Further, the gripper body 100 may longitudinally contact/extend. This can be easily implemented by separating a portion of the gripper body 100 into two vertically slidable parts, and the length can be manually adjusted by forming a plurality of holes at a portion thereof and forming pins that are inserted in a plurality of holes at the other side. It can be applied to various assembly objects by adjusting the vertical length.

The gripper body 100 may be composed of a vertical body portion 120, a bending portion 140 that bends rearward from the lower end of the body portion 120, and a vertical portion 160 that extends vertically downward from the lower end of the bending portion 140.

Further, the lower grip 200 is configured to support the lower end of the assembly object F by bending forward from the lower end of the gripper body 100, and the lower grip 200 may bend forward from the lower end of the vertical portion 160 of the gripper body 100. Therefore, the lower grip 200 supports the assembly object F from the back, when gripping the assembly object F.

Pressure sensors 162 and 240 are disposed at the vertical portion 160 and the lower grip 200 of the gripper body 100 to detect whether the lower end of the assembly object F has been completely gripped by the lower grip 200. Thereafter, the upper grip 300 can grip an assembly object through the detection. In particular, the lower grip 200 grips an assembly object first, which is detected by the pressure sensors 162 and 240, and then the upper grip 300 grips it, thereby safely gripping the assembly object F.

Meanwhile, a shock-absorbing portion 122 that protrudes forward and comes in contact with the assembly object F is formed at the body portion 120 of the gripper body 100, so that the assembly object F is prevented from inclining rearward when moving. In particular, when the assembly object is gripped by the lower grip 200 and the upper grip 300 and subsequently moved, there is no concern that the assembly object would incline toward a robot, that is, rearward in accordance with the shape of the assembly object F. Therefore, the shock-absorbing portion 122 is formed to prevent any inclining such that it stably supports the assembly object F between the upper grip 300 and the lower grip 200.

A locking protrusion 220 protruding upward is formed on the front end of the lower grip 200 to prevent the assembly object F from separating forward by locking the lower end of the assembly object F. Therefore, the lower end of the assembly object is locked by the lower grip 200 and prevented from separating forward by the locking protrusion 220. Further, the pressure sensors 162 and 240 sense whether the assembly object has been adequately gripped.

The upper grip 300 preferably is hinged to the upper end of the gripper body 100 at the rear end and extends with the front end in a parabolic shape. The upper grip 300 is connected to the upper end of the gripper body 100 by a hinge H, and the front end extends forward to grip the upper end of the assembly object F when rotating forward. Further, as the shape is a parabola, it grips an assembly object that can be changed in various ways by keeping pressing and holding the assembly object to the robot, that is, rearward.

The seat 400 preferably is configured to bend and extend rearward from the upper end of the gripper body 100 and the link assembly 500 composed of the first link 520 and the second link 540, which connect the upper end of the seat 400 and the upper grip 300 via the link assembly.

The driving unit 600 is configured to rotate the upper grip 300 rearward or forward by transmitting the driving force of the link assembly 500.

In particular, the rear end of the first link 520 of the link assembly 500 is connected to the upper end of the seat 400 by a hinge H, the rear end of the second link 540 is connected to the front end of the first link 520 by a hinge H, and the front end of the second link 540 is connected to the upper grip 300 by a hinge. The hinges, which may be similar in construction, are referred to herein as first, second, and third hinges, although any suitable number of hinges may be provided.

Further, the driving unit 600 may be an electric motor that is disposed at the seat 400 and transmits rotational force to the rear end of the first link 520.

Therefore, as the driving unit 600 is driven, the first link 520 rotates, and accordingly, the second link 540 is pressed and rotated. Further, the upper grip 300 is pushed and rotated by the second link 540, and as the upper grip 300 completely grips the upper end of the assembly object F, the first link 520 and the second link 540 form a straight line.

In particular, when the assembly object F is completely gripped by the lower grip 200 and the upper grip 300, the link assembly 500 fully opens the first link 520 and the second link 540 in a straight line, in which the first link 520 and the second link 540 form a straight line to maintain a stable position without mechanically rotating, so that the assembly object F is gripped and held by the upper grip 300 even though excessive power is not continuously transmitted from the driving unit 600.

Obviously, it would be necessary to make the point of time of complete gripping be the same as the point of time when the first link 520 and the second link 540 make a straight line, by adjusting the vertical length of the gripper body or the horizontal length of the seat in accordance with the shape of the assembly object.

Further, the seat 400 is configured to bend and extend orthogonally between the rear direction and the upward direction from the upper end of the gripper body 100 and can longitudinally contact/extend such that both the horizontal distance and the vertical distance of the upper grip on the seat can be adjusted.

Figure 4:
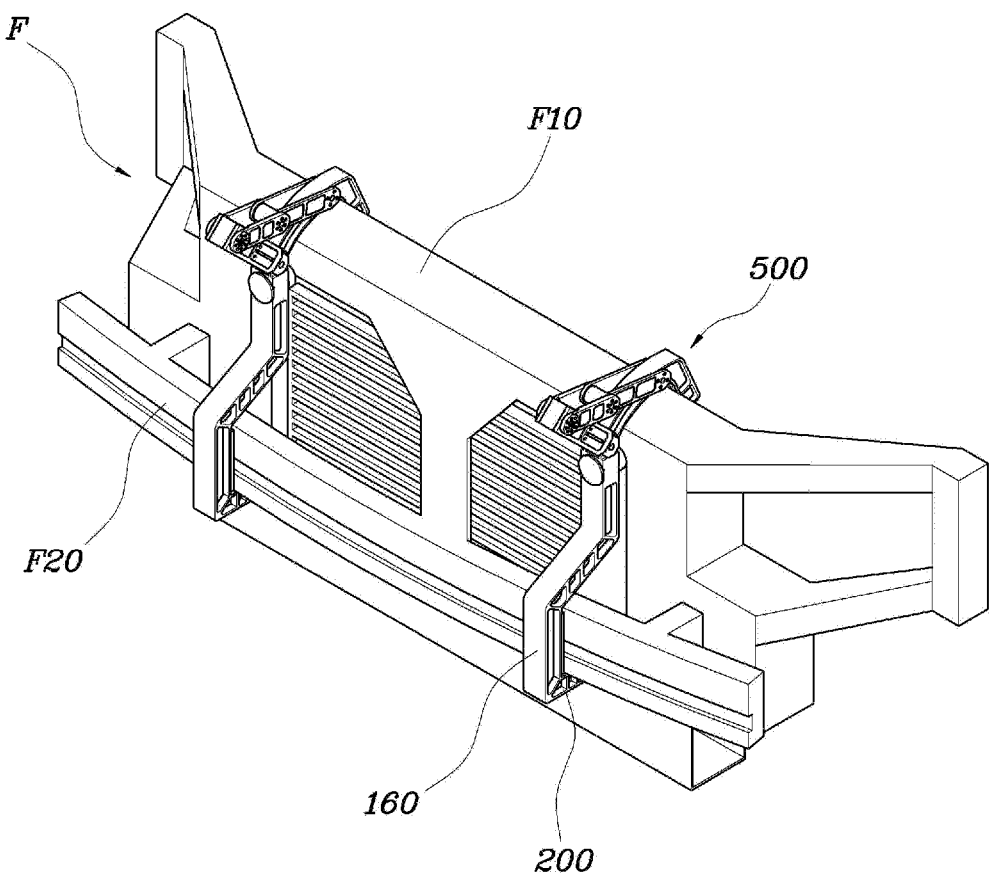
FIG. 4 is a view depicting a FEM that is held in the gripper as shown in FIG. 1.
Figure 5:
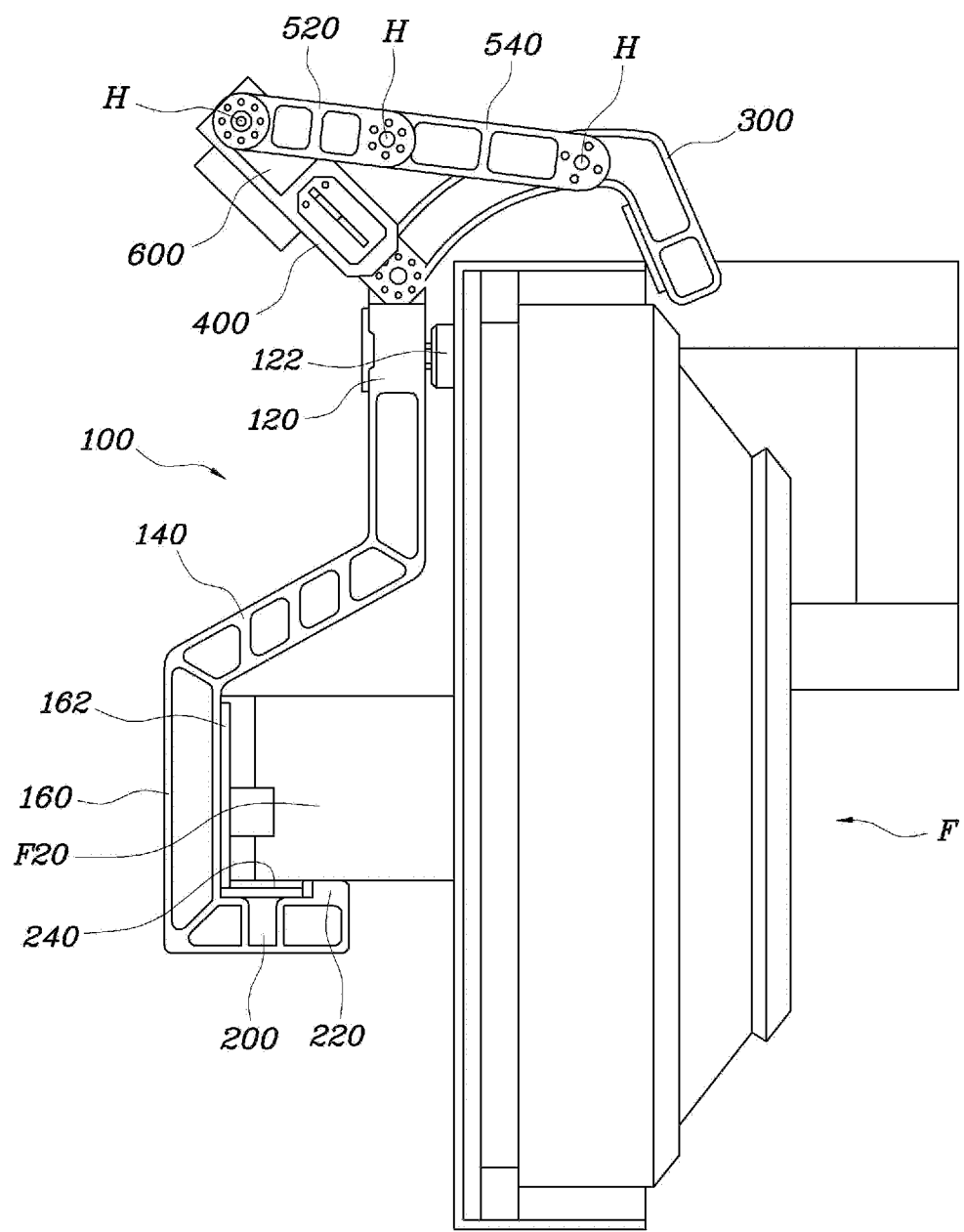
FIG. 5 is a perspective view of the gripper as shown in FIG. 4, in particular, as viewed from a side.

FIG. 4 is a view depicting a FEM that is held in the gripper according to the present invention, and FIG. 5 is a perspective view of the gripper shown in FIG. 4, in particular, as viewed from a side.

In this case, the assembly object F is an FEM of a vehicle, the lower grip 200 grips a bumper module F20 of the FEM, and the upper grip 300 grips the upper end F10 of the FEM. As described above, in the gripper of the present invention, for an FEM of a vehicle, the lower grip 200 supports the bumper module F20, and the upper grip 300 holds and grips the upper end F10 of the FEM, so that the gripper can move with the FEM held safely, and considering the curved shape of the bumper module F20, even a two-hand robot can easily and stably support it.

The assembly object F of the present invention may be applied to a fuel tank module or a shock absorber module of a vehicle. Further, the present invention is not limited thereto and may be applied to parts that are considerably heavy as used in the assembly modules of a vehicle. Therefore, when the assembly object F is a fuel tank module or a shock absorber module of a vehicle, the lower grip 200 may grip the lower end of the fuel tank module or the shock absorber module, and the upper grip 300 may grip the upper end of the fuel tank module or the shock absorber module.

According to the gripper having the structure described above, the gripper can be applied to common industrial robots or wearing robots.

Further, it is possible to easily lift and carry an FEM having a volume that is large relative to its weight by stably gripping the FEM.

The invention has been described in detail with reference to preferred embodiments thereof. However, it will be appreciated by those skilled in the art that changes may be made in these embodiments without departing from the principles and spirit of the invention, the scope of which is defined in the appended claims and their equivalents.

What is claimed is:

1. A gripper of a robot for assembling a vehicle, comprising:
    a gripper body that extends vertically, wherein the gripper body has a vertical body portion, a bending portion that bends rearward from a lower end of the vertical body portion, and a vertical portion that extends vertically downward from a lower end of the bending portion;
    a lower grip that bends forward from a lower end of the gripper body and supports a lower end of an assembly object;
    an upper grip that is hinged at a rear end to an upper end of the gripper body and grips an upper end of the assembly object when rotating forward by extending forward at a front end of the gripper body;
    a seat that extends and bends rearward from the upper end of the gripper body;
    a link assembly that is composed of a first link and a second link that connect an upper end of the seat and the upper grip via the link assembly; and
    a driving unit that rotates the upper grip forward or rearward by transmitting a driving force to the link assembly.

2. The gripper of claim 1, wherein the lower grip bends forward from a lower end of the vertical portion of the gripper body.

3. The gripper of claim 2, wherein pressure sensors are disposed at the vertical portion and the lower grip of the gripper body for detecting whether the lower end of the assembly object has been completely gripped by the lower grip.

4. The gripper of claim 1, wherein a shock-absorbing portion that protrudes forward and comes in contact with the assembly object is formed at the vertical body portion of the gripper body, so that the assembly object is prevented from inclining rearward when moving.

5. The gripper of claim 1, wherein a locking protrusion protruding upward is formed on a front end of the lower grip and prevents the assembly object from separating forward by locking the lower end of the assembly object.

6. The gripper of claim 1, wherein the upper grip is hinged to the upper end of the gripper body at the rear end and extends with the front end of the gripper body in a parabolic shape.

7. The gripper of claim 1, wherein a rear end of the first link of the link assembly is connected to the upper end of the seat by a first hinge, a rear end of the second link is connected to a front end of the first link by a second hinge, and a front end of the second link is connected to the upper grip by a third hinge.

8. The gripper of claim 7, wherein the driving unit is an electric motor that is disposed at the seat and transmits rotational force to the rear end of the first link.

9. The gripper of claim 1, wherein the first link and the second link of the link assembly are fully opened and positioned in a straight line, when the assembly object is completely gripped by the lower grip and the upper grip.

10. The gripper of claim 1, wherein the seat is configured to bend and extend orthogonally between a rear direction and an upward direction from the upper end of the gripper body.

11. The gripper of claim 1, wherein the assembly object is an FEM of a vehicle, the lower grip grips a bumper module of the FEM, and the upper grip grips an upper end of the FEM.

12. The gripper of claim 1, wherein the assembly object is a fuel tank module or a shock absorber module of a vehicle, the lower grip grips a lower end of the fuel tank module or the shock absorber module, and the upper grip grips an upper end of the fuel tank module or the shock absorber module.

13. The gripper of claim 1, the gripper is applied to common industrial robots or wearing robots.

* * * * *